UNITED STATES PATENT OFFICE.

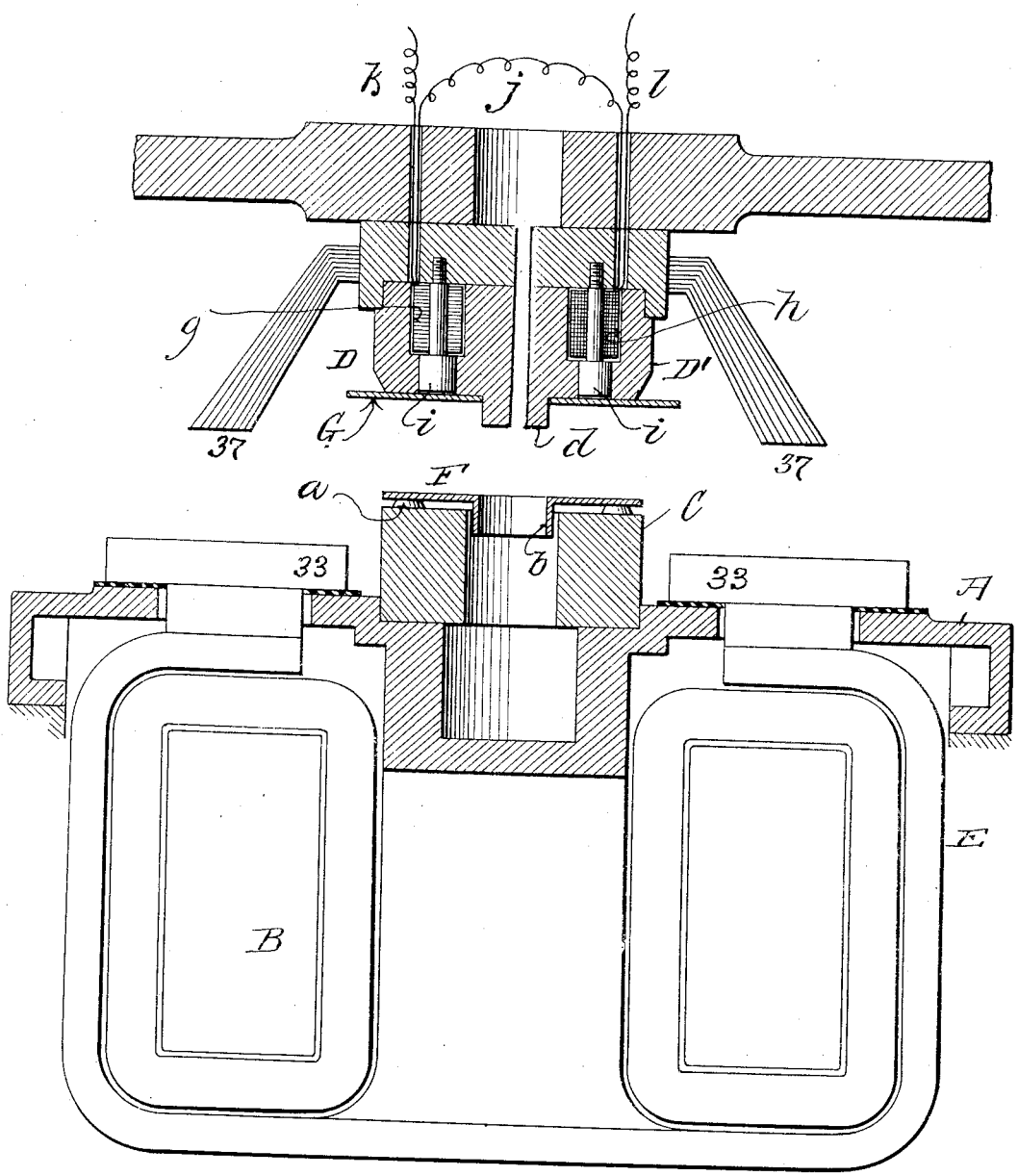

THOMAS E. MURRAY, OF NEW YORK, N. Y.

ELECTRIC WELDING-MACHINE.

1,215,964.  Specification of Letters Patent.  Patented Feb. 13, 1917.

Application filed November 13, 1916. Serial No. 130,996.

*To all whom it may concern:*

Be it known that I, THOMAS E. MURRAY, a citizen of the United States, residing at New York, in the county of New York and State of New York, have invented a certain new and useful Improvement in Electric Welding-Machines, of which the following is a specification.

In U. S. Letters Patent No. 1,187,543, for an electric welding machine, granted to H. R. Woodrow and myself June 20, 1916, we have set forth upper and lower clamping electrodes, between which the objects to be welded are held. The upper member of the clamp carries downwardly inclined brushes which coöperate with contact plates on the table of the machine, when said upper member is lowered. Said contact plates are connected to the secondary terminals of a transformer, so that the said brushes close said secondary circuit through the joint between the objects to be united, and said objects are thus electrically welded together.

My present invention consists in providing on one of two clamping electrodes, such as set forth in the aforesaid patent, means for magnetically holding the object to be welded in contact with the bottom face of said electrode. In practice, I prefer to place one of said objects upon the lower or fixed electrode and arrange electro-magnets in the upper electrode with polar extremities registering with the bottom face of said electrode, so that as said upper electrode moves downwardly, the object carried thereby is moved into contact with the object on said fixed electrode.

The accompanying drawing is a vertical section through the electrodes and transformer of a machine constructed in substantial accordance with the aforesaid Letters Patent and embodying my present improvement.

C is the lower fixed clamping member supported on a table A. B is a transformer, the secondary E of which has its terminals connected to the contact plates 33, insulated from said table. On the upper face of the electrode C are studs $a$, upon which rests one of the objects F to be welded—here the annular flange of a tube $b$. The upper and movable clamping electrode is formed in two separated conducting parts D, D', which respectively carry the brushes 37, and these brushes coöperate with the fixed plates 33. On the lower faces of the parts of electrode D, D' is a centering projection $d$ which enters the tube $b$.

Within the electrode D, D' are cavities, each of which contains an electro-magnet coil $g$, $h$. Said cavities communicate with the bottom face of electrode D, D' by openings of less diameter than said cavities. The enlarged heads $i$ of the electro-magnet cores are seated in said openings, and the body portions of said cores are shouldered and threaded to enter tapped sockets in said electrode. The two electro-magnets are connected in series by wire $j$, and the terminals $k$, $l$ are to be connected to any suitable source of current, whereby said magnets are energized.

The object G to be welded to the flange of object F is here an annular plate which, when placed against the lower face of electrode D, D' is attracted by the magnets $g$, $h$ when said magnets are energized, and so held in position in contact with said face. When electrode D, D' is moved downwardly, plate G is brought against the flange of object F, and by reason of the establishment of secondary circuit in the manner already described, said plate and flange are united by spot welds occurring at the studs $a$.

I claim:

1. An electric welding machine, comprising two electrodes receiving the objects to be welded between them, and a magnet on one of said electrodes for attracting and holding one of said objects in contact with said electrode.

2. An electric welding machine, comprising two electrodes, one of said electrodes being movable, and a magnet on said movable electrode for attracting and holding one of the objects to be welded in contact with said movable electrode.

3. An electric welding machine, comprising two electrodes, and an electro-magnet carried by one of said electrodes and having a polar extremity facing said other electrode.

4. An electric welding machine, comprising two electrodes, one of said electrodes having a recess, and an electro-magnet inclosed in said recess and having a core extending through the body of said electrode and terminating at the surface thereof facing the opposite electrode.

5. An electric welding machine, comprising a fixed electrode, a vertically movable electrode above said fixed electrode, and a magnet on said movable electrode for attracting and holding the object to be welded against the bottom surface of said movable electrode.

6. An electric welding machine, comprising a fixed electrode, studs on the upper surface of said electrode, a movable electrode above said fixed electrode, and electromagnets on said movable electrode having their polar extremities registering with the bottom surface thereof.

In testimony whereof I have affixed my signature in presence of two witnesses.

THOMAS E. MURRAY.

Witnesses:
   GERTRUDE T. PORTER,
   MAY T. McGARRY.